United States Patent [19]
Lee et al.

[11] Patent Number: 5,785,733
[45] Date of Patent: Jul. 28, 1998

[54] FLUIDIZED BED TYPE REDUCTION APPARATUS FOR IRON ORE PARTICLES AND METHOD FOR REDUCING IRON ORE PARTICLES USING THE APPARATUS

[75] Inventors: Il Ock Lee; Yong Ha Kim; Bong Jin Jung; Hang Goo Kim, all of Kyongsangbook-do, Rep. of Korea; Franz Hauzenberger, Linz, Austria

[73] Assignees: Pohang Iron & Steel Co., Ltd.; Research Institute of Industrial Science & Technology, both of Pohang, Rep. of Korea; Voest-Alpine Industrieanlagenbau GmbH, Linz, Austria

[21] Appl. No.: 702,517

[22] PCT Filed: Dec. 28, 1995

[86] PCT No.: PCT/KR95/00182

§ 371 Date: Oct. 28, 1996

§ 102(e) Date: Oct. 28, 1996

[87] PCT Pub. No.: WO96/21045

PCT Pub. Date: Jul. 11, 1996

[30] Foreign Application Priority Data

Dec. 31, 1994 [KR] Rep. of Korea ............... 1994/40302

[51] Int. Cl.$^6$ .................. C21B 11/00; C21B 13/14
[52] U.S. Cl. .................. 75/444; 75/450; 266/172; 266/156
[58] Field of Search .................. 266/142, 172, 266/154, 144, 168, 156; 75/444, 450

[56] References Cited

U.S. PATENT DOCUMENTS

| | | | |
|---|---|---|---|
| 4,434,001 | 2/1984 | Edstrom | 75/3 |
| 5,370,727 | 12/1994 | Whipp | 75/436 |
| 5,407,179 | 4/1995 | Whipp | 266/172 |
| 5,439,504 | 8/1995 | Czermak et al. | 266/172 |
| 5,531,424 | 7/1996 | Whipp | 266/172 |

FOREIGN PATENT DOCUMENTS 3215621  9/1991  Japan.

*Primary Examiner*—Scott Kastler
*Attorney, Agent, or Firm*—Webb Ziesenheim Bruening Logsdon Orkin & Hanson, P.C.

[57] ABSTRACT

A reduction apparatus and a method for efficient reduction of fine iron ores of wide grain range comprising serially arranged a drying/preheating furnace, a first reducing furnace for prereduction and a second reduction furnace for final reduction, each working with bubbling fluidized bed and being connected each to a cyclone for capturing iron ore dust contained in the exhaust gases, having each a tapered shape smoothly expanded outwards and thus considerably decreasing elutriation of fine particles, increasing the reduction efficiency and enhancing the utilization of the reducing gas.

36 Claims, 2 Drawing Sheets

FLUIDIZED BED TYPE REDUCTION APPARATUS FOR IRON ORE PARTICLES AND METHOD FOR REDUCING IRON ORE PARTICLES USING THE APPARATUS

BACKGROUND OF THE INVENTION

1. Field of the Invention

The present invention relates to a fluidized-bed-type reduction apparatus for reducing fine iron ores in the procedure of producing pig iron or ingot iron and a method for reducing iron ore particles using such an apparatus, and more particularly to a fluidized bed type reduction apparatus capable of efficiently reducing fine iron ores of wide size ranges in a stably fluidized state and a method for reducing iron fine ores using the apparatus.

2. Description of the Prior Art

Generally, conventional methods for producing pig iron from reduced iron ores include a method using blast furnaces and a method using shaft furnaces. In the latter method, iron ores reduced in a shaft furnace are melted in an electric furnace.

In the case of the method for producing pig iron using blast furnaces, a large amount of coke is used as a heat source and reducing agent. In accordance with this method, iron ores are charged in the form of sintered ores in order to improve the gas-permeability and reduction. To this end, conventional methods using blast furnaces need a coke oven for producing coking coal and equipment for producing sintered ores. For this reason, the method using blast furnaces is a method requiring a huge investment and a high energy consumption. Since high quality coking coal is maldistributed in the world and the amount of its reserves are diminishing, the shortage thereof becomes severe as the demand for steel increases. On the other hand, the method of reducing iron ores using shaft furnaces requires a pretreating step for pelletizing iron ores. Since this method also uses natural gas as a heat source and reducing agent, it has a drawback that it can be commercially implemented only in areas where an easy supply of natural gas is ensured.

Recently, a smelting reduction method capable of producing ingot iron from iron ores using non-coking coal in place of coke has been remarkable as a new iron production method.

Such a smelting reduction method typically employs a system wherein iron ores pre-reduced in a separate furnace are completely reduced in a melting furnace to produce hot metal. In the reduction furnace, iron ores are reduced in a solid phase before they are melted. In other words, iron ores charged in the reduction furnace are reduced while being in contact with hot reducing gas generated in the melting furnace.

The reduction process used in this method is classified into a moving bed type and a fluidized bed type in accordance with the condition that iron ores are in contact with the reducing gas. It has been known that one of the most promising method for the reduction of fine iron ores of wide size distribution is the fluidized bed type process wherein the ores are reduced in a fluidized state by a reducing gas supplied through a distributor which is installed in the lower part of the reactor.

An example of the fluidized-bed-type reduction furnace is disclosed in Japanese Patent Laid-open Publication No. Heisei 3-215621. As shown in FIG. 1, this furnace comprises a cylindrical reduction furnace 91 and a cyclone 95. When iron ores are charged through an inlet 92 and a reducing gas is supplied in the reduction furnace 91 via a line 93 and a distributor 96 at an appropriate flow rate, the iron ores form-a fluidized bed above the distributor so that they can be mixed and agitated with the reducing gas. In this state, the iron ores can be reduced by the reducing gas. The reducing gas supplied in the furnace forms bubbles in a layer of iron ore particles as if a fluid is boiled, and then rises through the particle layer, thereby forming a fluidized bed of iron ore particles. Therefore, this fluidized bed is a bubbling fluidized bed. The reduced iron ores are discharged out of the reduction furnace 91 through an outlet 94.

In the case of the fluidized-bed-type reduction apparatus disclosed in the above publication, it is necessary to minimize the flow rate of the reducing gas while forming an effective fluidized bed so as not only to reduce the elutriation of iron ores, but also to increase the efficiency of the reducing gas. To this end, the grain size of iron ore particles should be strictly limited to a certain range if the flow rate of the reducing gas in the fluidized bed is constant along the longitudinal axis of the fluidized bed. In other words, the gas velocity of the reducing gas required to form an effective fluidized bed should be controlled between a minimum fluidizing velocity and a terminal velocity. For such a fluidized bed type reduction furnace, accordingly, iron ore particles should be screened in terms of their grain size so that only those of similar grain ranges can be charged into the reduction furnace. If the operation is carried out at a high gas velocity which is required to fluidize coarse iron ore (which would not be fluidized at a low gas velocity), it will result in a large amount of the elutriation of fine iron ore because the terminal velocity of the fine ore is lower than the operating gas velocity. As the result, the dust collecting efficiency of the cyclones is reduced, thereby increasing the loss of the raw material. Furthermore, the reduction rate of circulating fine iron ore is degraded because their mean residence time in the reduction furnace is shorter than that of coarse iron ore.

The inventors proposed the present invention which can solve the above-mentioned problems encountered in the conventional methods, based on the results of their research and experiments.

SUMMARY OF THE INVENTION

Therefore, an object of the invention is to provide a fluidized-bed-type reduction apparatus and a method for reducing fine iron ores using the apparatus, which can efficiently reduce fine iron ores of wide size ranges in a stably fluidized state, thereby considerably decreasing the elutriation of the particles, increasing the reduction rate and enhancing the efficiency of the reducing gas.

In accordance with this object, an apparatus comprising serially-arranged, multi-stage fluidized bed type furnaces is provided. In this system, each reactor is in tapered shape, i.e., the diameter of the reactor increases in the upper direction in order to stably fluidize fine iron ore of wide grain size ranges. The reduction apparatus includes a furnace for drying and preheating fine iron ore particles and, at least, one reduction furnace for reducing the dried/preheated iron ores.

In accordance with one aspect, the present invention provides a fluidized-bed-type reduction apparatus for reducing fine iron ores, comprising: a drying/preheating furnace for drying and preheating iron ores supplied from a hopper in a bubbling fluidized state; a first cyclone for capturing dusty iron ores contained in exhaust gas from the drying/preheating furnace; a reduction furnace for finally reducing the dried/preheated iron ores in a bubbling fluidized state; and a second cyclone for collecting dusty iron ores contained in exhaust gas from the reduction furnace. Hereinafter, this apparatus will be referred to as a two-stage fluidized-bed-type reduction apparatus.

In accordance with another aspect, the present invention provides a fluidized-bed-type reduction apparatus for reducing fine iron ore, comprising: a drying/preheating furnace for drying and preheating fine iron ores supplied from a hopper, in a bubbling fluidized state; a first cyclone for capturing dusty iron ores contained in exhaust gas from the drying/preheating furnace; a first reduction furnace pre-reducing the dried/preheated iron ores in a bubbling fluidized state; a second cyclone for collecting dusty iron ores contained in exhaust gas from the first reduction furnace; a second reduction furnace for finally reducing the pre-reduced iron ores in a bubbling fluidized state; and a third cyclone for capturing dusty iron ores contained in exhaust gas from the second reduction furnace. Hereinafter, this apparatus will be referred to as a three-stage fluidized bed type reduction apparatus.

In accordance with another aspect, the present invention provides a method for reducing fine iron ores of wide size distribution, comprising the steps of: drying and preheating the iron ores in a bubbling fluidized state in a tapered-fluidized bed of which diameter increases in the upper direction; and finally reducing the dried/preheated iron ores in a bubbling fluidized state in a tapered-fluidized bed of which diameter increases in the upper direction. Hereinafter, this method will be referred to as a two-stage reduction method.

In accordance with another aspect, the present invention provides a method for reducing fine iron ores of wide size distribution, comprising the steps of: drying and preheating the iron ores in a bubbling fluidized state in a tapered-fluidized bed of which diameter increases in the upper direction; pre-reducing the dried/preheated iron ores in a bubbling fluidized state in a first tapered-fluidized bed of which diamer increases in the upper direction; and finally reducing the pre-reduced iron ores in a bubbling fluidized state in a second tapered-fluidized bed of which diameter increases in the upper direction. Hereinafter, this method will be referred to as a three-stage reduction method.

BRIEF DESCRIPTION OF THE DRAWINGS

Other objects and aspects of the invention will become apparent from the following description of embodiments in conjunction with the accompanying drawings in which.

DETAILED DESCRIPTION OF THE PREFERRED EMBODIMENTS

Figure 1:
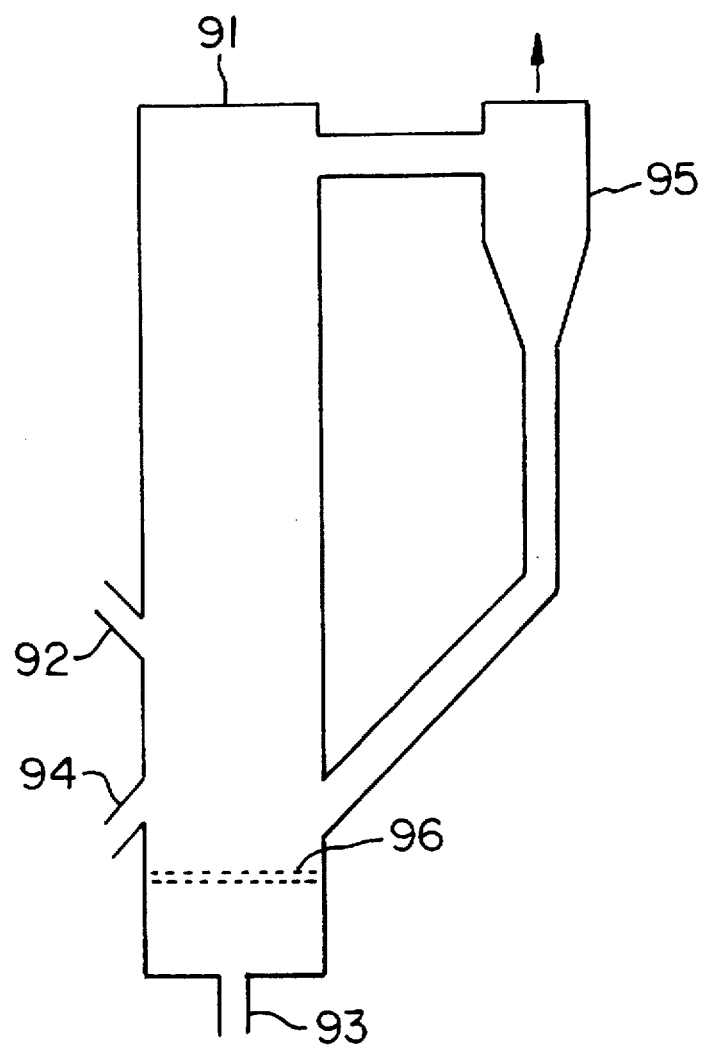
FIG. 1 is a schematic diagram illustrating a conventional fluidized-bed-type reduction furnace for reducing iron ores.
Figure 2:
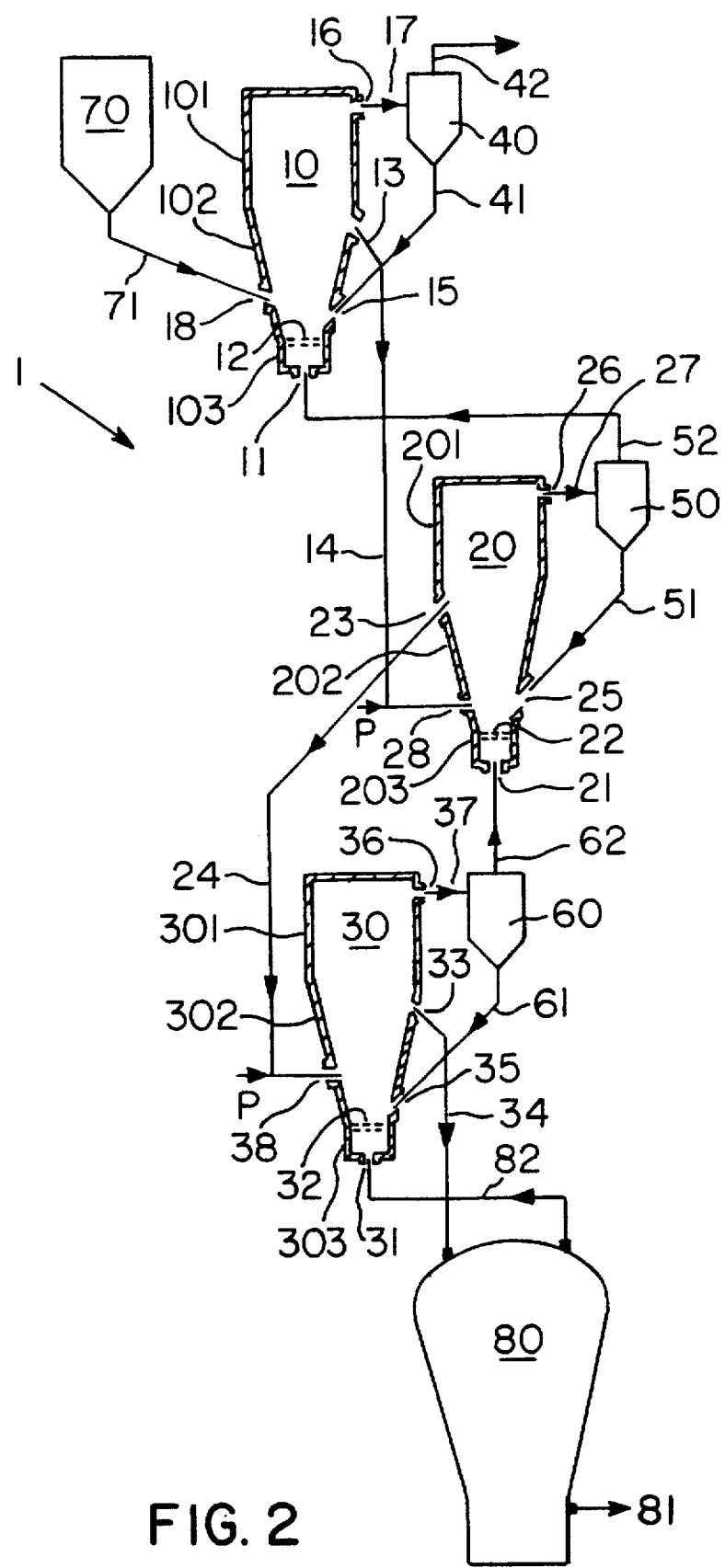
FIG. 2 is a schematic diagram illustrating a fluidized-bed type reduction apparatus for reducing fine iron ores in accordance with the present invention.

In FIG. 2, a three-stage fluidized-bed-type reduction apparatus for reducing fine iron ores of wide size distribution in accordance with the present invention is illustrated.

As shown in FIG. 2, the three-stage, fluidized-bed-type reduction apparatus 1 includes a furnace 10 for drying and preheating iron ores, which are supplied as a raw material from a hopper 70, in a bubbling fluidized state. A first cyclone 40, which serves to collect dusty iron ores contained in exhaust gas discharged from the drying/preheating furnace 10, is connected to the above-mentioned drying/preheating furnace 10. Under the drying/preheating furnace 10, a first reduction furnace 20 is arranged to receive the dried/preheated iron ores discharged from the drying/preheating furnace 10. In the first reduction furnace 20, the dried/pre-heated ores are pre-reduced in a bubbling fluidized state. A second cyclone 50 is connected to the first reduction furnace 20 in order to collect dusty iron ores contained in exhaust gas discharged from the first reduction furnace 20. A second reduction furnace 30 is also arranged under the first reduction furnace 20. The second reduction furnace 30 receives the pre-reduced iron ores from the first reduction furnace 20 and finally reduces the pre-heated iron ores in a bubbling fluidized state. A third cyclone 60 is connected to the second reduction furnace 30 in order to collect dusty iron ores contained in exhaust gas discharged from the second reduction furnace 30.

The drying/preheating furnace 10 is given in a tapered shape being smoothly expanded upwards. In details, the drying/preheating furnace 10 consists of an enlarged upper cylindrical section 101, an intermediate conical section 102 and a reduced lower cylindrical section 103. The drying/preheating furnace 10 is fitted with a first gas inlet 11 at the bottom portion for receiving exhaust gas from the first reduction furnace 20. Between the conical section 102 and the reduced cylindrical section 103, a first distributor 12 is installed to evenly distribute the exhaust gas supplied through the first gas inlet 11.

A portion of the side wall of the conical section 102 is fitted with a first ore inlet 18 through which iron ores are charged from the hopper 70 via an ore supply line 71. At another portion of the side wall of conical section 102 opposite to the portion fitted with the first ore inlet 18, the drying/preheating furnace 10 has a first ore outlet 13 for discharging the dried/preheated iron ores from the drying/preheating furnace 10 and a first dusty ore inlet 15 for receiving dusty iron ore particles captured by the first cyclone 40.

A first exhaust gas outlet 16 is provided at the upper portion of the enlarged cylindrical section 101. This first exhaust gas outlet 16 is connected to the first cyclone 40 via a first exhaust gas line 17.

The top portion of the first cyclone 40 is fitted up with a first cleaned gas discharge line 42 for outwardly discharging cleaned exhaust gas from the first cyclone 40. To the bottom portion of the first cyclone 40, one end of a first dusty ore discharge line 41 is connected. The other end of the first dusty ore discharge line 41 is connected to the first dusty ore inlet 15 attached to the conical section 102 of the drying/preheating furnace 10 so that the dusty iron ores captured by the first cyclone 40 is recycled to the drying/preheating furnace 10.

Similarly to the drying/preheating furnace 10, the first reduction furnace 20 is given in a tapered shape being smoothly expanded upwards. That is, the first reduction furnace 20 consists of an enlarged upper cylindrical section 201, an intermediate conical section 202 and a reduced lower cylindrical section 203. The first reduction furnace 20 is also fitted with a second gas inlet 21 at the bottom portion for receiving exhaust gas from the second reduction furnace 30. Between the conical section 202 and the reduced cylindrical section 203, a second distributor 22 is installed to evenly distribute the exhaust gas supplied through the second gas inlet 21.

At one side wall portion of the conical section 202, the first reduction furnace 20 has a second ore outlet 23 for discharging iron ores pre-reduced in the first reduction furnace 20, and a second ore inlet 28 for receiving the dried/preheated iron ore particles from the drying/preheating furnace 10. At the other side wall portion of the conical section 202, the first reduction furnace 20 has a second dusty ore inlet 25 for receiving dusty iron ores captured by the second cyclone 50.

A second exhaust gas outlet 26 is provided at the upper portion of the enlarged cylindrical section 201. This second exhaust gas outlet 26 is connected to the second cyclone 50 via a second exhaust gas line 27.

The top portion of the second cyclone 50 is connected to one end of a second cleaned exhaust gas line 52. To the bottom portion of the second cyclone 50, a second dusty ore discharge line 51 is connected.

The other end of the second cleaned exhaust gas line 52 is connected to the first gas inlet 11 attached to the bottom portion of the drying/preheating furnace 10 in order to supply exhaust gas, which becomes free of iron ores in the second cyclone 50, to the drying/preheating furnace 10. The other end of the second dusty ore discharge line 51 is connected to the second dusty ore inlet 25 attached to the conical section 202 of the first reduction furnace 20 so as that the dusty iron ores captured by the second cyclone 50 is recycled to the first reduction furnace 20.

The second ore inlet 28 of the first reduction furnace 20 is connected to the first ore outlet 13 of the drying/preheating furnace 10 with a first duct line 14.

Similar to the first reduction furnace 20, the second reduction furnace 30 is also given in a tapered shape being smoothly expanded upwards. That is, the second reduction furnace 30 consists of an enlarged upper cylindrical section 301, an intermediate conical section 302 and a reduced lower cylindrical section 303. The second reduction furnace 30 is also fitted with a third gas supply port 31 at the bottom portion for receiving exhaust gas from a melter gasifier 80. Between the conical section 302 and the reduced cylindrical section 303, a third distributor 32 is installed to evenly distribute the exhaust gas supplied through the third gas inlet 31.

At one side wall portion of the conical section 302, the second reduction furnace 30 has a third ore inlet 38 for receiving the pre-reduced iron ores from the first reduction furnace 20. At the other side wall portion of the conical section 302, the second reduction furnace 30 has a third dusty ore inlet 35 for receiving dusty iron ores captured by the third cyclone 60 and a third ore outlet 33 for discharging iron ores finally reduced in the second reduction furnace 30.

At the upper portion of the enlarged cylindrical section 301, the second reduction furnace 30 has a third exhaust gas outlet 36 which is connected to the third cyclone 60 via a third exhaust gas line 37.

The top portion of the third cyclone 60 is connected to one end of a third cleaned exhaust gas line 62. To the bottom portion of the third cyclone 60, one end of a third dusty ore discharge line 61 is connected.

The other end of the third cleaned exhaust gas line 62 is connected to the second gas inlet 21 provided at the bottom portion of the first reduction furnace 20 in order to supply exhaust gas, which become free of iron ores in the third cyclone 60, to the first reduction furnace 20. The other end of the third dusty ore discharge line 61 is connected to the third dusty ore inlet 35 provided at the conical section 302 of the second reduction furnace 30 so that the dusty iron ores captured by the third cyclone 60 is recycled to the second reduction furnace 30.

The third ore inlet 38 of the second reduction furnace 30 is connected to the second ore outlet 23 of the first reduction furnace 20 with a second duct line 24.

The third ore outlet 33 is connected to the melter gasifier 80 through a third duct line 34 whereas the third gas inlet 31 is connected to the melter gasifier 80 through an exhaust gas line 82.

The bottom portion of the melter gasifier 80 is connected to a pig iron discharge line 81 for discharging pig iron produced by a smelting reduction operation in the melter gasifier 80.

At the curved or elbow portion of the first duct line 14, a gas supply port P is installed for supplying a small amount of gas to the first conduit 14 in order to prevent the conduit 14 from being plugged by iron ore particles being fed in the duct line 14. For the same purpose, another gas supply port P is installed at the curved or elbow portion of the second duct line 24.

Although the present invention has been described as embodying the reduction apparatus of the three-stage fluidized-bed-type, it may also be constructed or modified in the form of a two-stage fluidized-bed-type. The two-stage fluidized bed type reduction apparatus has basically the same construction as that of the three-stage fluidized bed except that it includes only one reduction furnace which may be either the first or second reduction furnaces 20 and 30. In this case, iron ore particles dried and preheated in the drying/heating furnace is almost completely reduced in the single furnace.

Preferably, the conical sections 102, 202 and 302 of the drying/preheating furnace 10, first reduction furnace 20 and second reduction furnace 30 have a taper angle ranging from 3° to 25°.

It is also preferred that the conical sections 102, 202 and 302 of the drying/preheating furnace 10, first reduction furnace 20 and second reduction furnace 30 have a height 5.0 to 9.0 times as long as the inner diameter at each lower end. On the other hand, the enlarged sections 101, 201 and 301 of the drying/preheating furnace 10, first reduction furnace 20 and second reduction furnace 30 preferably have a height 2.0 to 4.0 times as long as the inner diameter at the upper end of each corresponding conical section.

Now, a method for producing reduced iron or molten pig iron using the reduction apparatus of fluidized-bed-type of the present invention will be described.

As shown in FIG. 2, iron ores contained in the hopper 70 are supplied to the drying/preheating furnace 10 through the ore supply line 71 and first ore inlet 18. The drying/preheating furnace 10 is also supplied with exhaust gas from the first reduction furnace 20 through the second cyclone 50, the second cleaned exhaust gas line 52 and first gas inlet 11 in order. This exhaust gas is uniformly dispersed in the drying/preheating furnace 10 by means of the first distributor 12. By the uniformly dispersed gas, the iron ore particles supplied in the drying/preheating furnace 10 form a bubbling fluidized bed, and are dried and preheated in the fluidized bed. The dried/preheated iron ores are then fed to the first reduction furnace 20 via the first ore outlet 13 and first duct line 14.

The exhaust gas is discharged outward from the drying/preheating furnace 10, in which iron ores are dried and preheated by the gas before being exhausted, via the first exhaust gas outlet 16 and first exhaust gas line 17, first cyclone 40 and first cleaned exhaust gas line 42 in order. Dusty iron ores contained in the exhaust gas are captured by the first cyclone 40 and then recycled to the drying/ preheating furnace 10 via the first dusty ore discharge line 41 and first dusty ore inlet 15.

The dried/preheated iron ores supplied in the first reduction furnace 20 are then pre-reduced while forming a bubbling fluidized bed by the exhaust gas which is fed to the first reduction furnace 20 via the third cyclone 60, third cleaned exhaust gas line 62, second gas inlet 21 and second distributor 22 in order. The pre-reduced iron ores are fed to the second reduction furnace 30 via the second ore outlet 23 and second duct line 24.

In the first reduction furnace 20, the exhaust gas from the second reduction furnace 30 is used for the prereduction of the iron ores and then discharged from the first reduction furnace 20 via the second exhaust gas outlet 26 and second exhaust gas line 27, second cyclone 50 and second cleaned exhaust gas line 52 in order and then introduced into the drying/preheating furnace 10. Dusty iron ores contained in the exhaust gas are captured by the second cyclone 50 and then recycled to the first reduction furnace 20 via the second dusty ore discharge line 51 and second dusty ore inlet 25.

Meanwhile, the pre-reduced iron ores supplied in the second reduction furnace 30 are finally reduced while forming a bubbling fluidized bed by the exhaust gas which is generated from the melter gasifier 80 and supplied to the second reduction furnace 30 via the exhaust gas line 82, third gas inlet 31 and third distributor 32. The finally reduced iron ores are fed to the melter gasifier 80 via the third ore outlet 33 and third duct line 34.

The exhaust gas generated from the melter gasifier 80 is at first used for the final reduction of iron ore in the second reduction furnace and then is introduced into the first reduction furnace 20 after being discharged through the third exhaust gas discharge port 36 and third exhaust gas line 37, third cyclone 60 and third cleaned exhaust gas line 6. Dusty iron ores contained in the exhaust gas are captured by the third cyclone 60 and then recycled to the second reduction furnace 30 via the third dusty ore discharge line 61 and third dusty ore inlet 35.

The iron ore particles charged into the melter gasifier 80 is melted, thereby producing molten pig iron (hot metal).

On the other hand, it is preferred that the gas velocity at free board zone in each of the drying/preheating furnace 10, first reduction furnace 20 and second reduction furnace 30 is kept within 1.0 to 3.0 times the minimum gas velocity required for fluidizing iron ore particles of the mean grain size staying in the relevant furnace.

For the drying/preheating furnace 10, first reduction furnace 20 and second reduction furnace 30, the pressure drop in the furnace preferably ranges from 0.3 to 0.6 atm. and the temperature drop in the furnace preferably ranges from 30° to 80° C. It is also preferred that the pressure and temperature of gas supplied to the second reduction furnace 30 range from 2 to 4 atm. and 800° to 900° C., respectively.

Preferably, the residence time of iron ore particles in each furnace is 20 to 40 minutes.

Although the method of the present invention has been described for reducing fine iron ores by use of the three-stage fluidized-bed-type reduction apparatus, it may be also used in a two-stage fluidized-bed-type reduction apparatus for the reduction of fine iron ores. As mentioned above, the two-stage fluidized-bed-type reduction apparatus has basically the same construction as that of the three-stage fluidized bed except that it includes only one reduction furnace. In the case using the two-stage fluidized-bed-type reduction apparatus, iron ores dried and preheated in the drying/heating furnace are almost completely reduced in the single furnace.

In this case, it is preferred that the gas velocity in free board zone of either the drying/preheating furnace or single reduction furnace is kept within 1.0 to 3.0 times the minimum gas velocity required for fluidizing iron ore particles of the mean grain size staying in the relevant furnace.

For either the drying/preheating furnace or the single reduction furnace, the pressure drop occurring in the furnace preferably ranges from 0.3 to 0.6 atm. and the temperature drop occurring in the furnace preferably ranges from 30° to 80° C. It is also preferred that the pressure and temperature of gas supplied to the reduction furnace range from 2 to 4 atm. and 800° to 900° C., respectively.

It is also preferred that the residence time of iron ore particles in each furnace be 30 to 50 minutes.

As apparent from the above description, each furnace employed in accordance with the present invention is given a tapered shape, i.e., the diameter of the furnace increases in the upper direction so as to stably fluidize iron ore particles of wide grain size ranges. With such a shape, it is possible not only to ensure the fluidization of coarse iron ore particles, but also to more stably fluidize fine iron ore particles, thereby achieving an efficient reduction of fine iron ores. In accordance with the present invention, the reduction of fine iron ores is achieved in multiple stages, for example, three stages comprising the drying/preheating, first reduction and second reduction stages all having different operations. In accordance with the present invention, exhaust gas generated from each furnace is efficiently used, thereby reducing the fuel consumption.

The reason why the reduction of fine iron ores is efficiently carried out by virtue of the furnace construction according to the present invention will now be described in more detail. Since the cross-sectional area of the furnace of the present invention gradually increases toward the upper end of the furnace, the gas velocity in the furnace gradually decreases toward the upper end of the furnace. Accordingly, coarse iron ore particles mostly distributed near the distributor installed at the lower part of the furnace can be well fluidized at a high gas velocity. On the other hand, fine iron ore particles mostly distributed at the upper part of the furnace can be appropriately fluidized at medium/low gas velocity while being suppressed so as not to be elutriated. Accordingly, the residence time of iron ore particles in the furnace can be kept constant irrespective of the grain size. Therefore, iron ores of wide grain size ranges can be efficiently reduced while maintaining a stable fluidized state. The reduction apparatus of the present invention comprises serially-arranged, multi-stage fluidized-bed-type furnaces, namely, the drying/preheating furnace for drying and preheating fine iron ores, the first reduction furnace for pre-reducing the dried/preheated fine iron ores, and the second reduction furnace for finally reducing the prereduced iron ore particles. In this apparatus, exhaust gas generated from each furnace is used as a reducing gas for the preceding reduction stage, thereby increasing the utilization degree of the reducing gas. Therefore, the apparatus and method of the present invention provide an economical efficiency of great interest.

The present invention will be understood more readily with reference to the following example; however this example is only intended to illustrate the invention and is not to be construed to limit the scope of the present invention.

EXAMPLE

A fluidized-bed-type reduction apparatus having the construction as shown in FIG. 2 was prepared. This fluidized-bed-type reduction apparatus had the following dimension:

| | |
|---|---|
| 1) Inner Diameter and Height of Each Fluidized-Bed-Type Furnace (Drying/Preheating Furnace, First Reduction Furnace and Second Reduction Furnace) | |
| - Inner Diameter of Conical Section at Lower End | 0.3 m; |
| - Height of Conical Section | 1.9 m; |
| - Inner Diameter of Conical Section at Upper End: | 0.7 m; |
| - Height of Each Cylindrical Section and | 2.0 m; |
| - Taper Angle of Conical Section | 6° |

Fine iron ores were then charged into the drying/preheating furnace 10 of the fluidized bed type reduction apparatus made as mentioned above, and at the same time a reducing gas was also supplied to the second reducing furnace 30 through the third gas inlet 31 and third gas distributor 32 both installed at the second reducing furnace 30.

The fine iron ores were dried and preheated while forming a bubbling fluidized bed by the reducing gas. After being dried and preheated, the iron ores were fed to the first reduction furnace 20, in which they were, in turn, pre-reduced. After being pre-reduced, the iron ores were fed to the second reduction furnace 30 and then finally reduced. The iron ores from the second reduction furnace 30 were then fed to the melter gasifier 80. In the melter gasifier, the iron ores were melted. The following conditions were used in the above process:

| | | |
|---|---|---|
| 2) | Charge and Discharge of Iron Ore Particles | |
| | - Composition of Fine Iron Ores | |
| | T.Fe: 62.36%, $SiO_2$: 5.65%, $Al_2O_3$: 2.91%, S: 0.007%, and P: 0.065%; | |
| | - Particle Size Range | |
| | - 0.25 mm = 22%, 0.25 mm – 1.0 mm = 28%, and 1.0 mm – 5.0 mm = 50%; | |
| | - Feed Rate 20 Kg/min | |
| | - Discharge Rate from Third Ore Discharge Port 14.3 Kg/min | |
| 3) | Reducing Gas | |
| | - Composition | CO: 65%, $H_2$: 25%, and $CO_2 + H_2O$: 10%; |
| | - Temperature | about 850° C.; and |
| | - Pressure | 3.3 Kgf/cm$^2$ |
| 4) | Gas Velocity in Each Furnace (Drying/Preheating Furnace, First Reduction Furnace and Second Reduction Furnace) | |
| | - Gas Velocity at Lower End of Conical Section | 1.5 m/s; and |
| | - Gas Velocity at Upper End of Conical Section | 0.27 m/s |

After 60 minutes from the beginning of the reduction, the discharge of reduced iron started. In this test, the average utilization degree of the gas was about 25% whereas the average reduction degree was 87%. The loss of iron ores caused by the elutriation of dusty iron ores was 0.5%. From this result, it can be concluded that the present invention greatly reduces the loss of iron ores compared to the conventional cylindrical fluidized bed of which usual loss of iron ores ranges from 8 to 10%.

As apparent from the above description, the present invention, a fluidized-bed-type reduction apparatus and a method for reducing iron ore particles using the apparatus, is capable of suppressing the elutriation of dusty iron ores in reduction furnaces, thereby reducing the loss of iron ores as well as increasing the reduction degree. In accordance with the present invention, the reduction apparatus comprises three fluidized-bed-type furnaces, thereby increasing the utilization degree of exhaust gas and reducing fuel consumption.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, although the present invention has been described in conjunction with the two- or three-stage fluidized-bed-type reduction apparatus and reduction method using this apparatus, it may be applied to reduction apparatus and method capable of reducing iron ore particles in at least four fluidization stages.

What is claimed is:

1. A fluidized-bed reduction apparatus for reducing iron ore particles, comprising:

a drying/preheating furnace for drying and preheating fine iron ores supplied from a hopper, the drying/preheating furnace including a first enlarged upper cylindrical section, a first intermediate conical section and a first reduced lower cylindrical section, the first intermediate conical section having a tapered shape being smoothly expanded upwards, the drying/preheating furnace further including a first gas inlet provided at a bottom portion of the first reduced cylindrical section, a first distributor installed at an upper portion of the first reduced cylindrical section, a first ore inlet provided at one side wall portion of the first conical section, a first ore outlet provided at the other side wall portion of the first conical section, a first dusty ore inlet provided at the other side wall portion of the first conical section, and a first exhaust gas outlet provided at an upper portion of the first enlarged cylindrical section;

a reduction furnace for finally reducing the fine iron ores dried and preheated in the drying/preheating furnace, the reduction furnace including a second enlarged upper cylindrical section, a second intermediate conical section and a second reduced lower cylindrical section, the second intermediate conical section having a tapered shape being smoothly expanded upwards, the reduction furnace further including a second gas inlet provided at a bottom portion of the second reduced cylindrical section, a second distributor installed at an upper portion of the second reduced cylindrical section, a second ore inlet provided at one side wall portion of the second conical section, a second ore outlet provided at the one side wall portion of the second conical section, a second dusty ore inlet provided at the other side wall portion of the second conical section, and a second exhaust gas outlet provided at an upper portion of the second enlarged cylindrical section;

a first cyclone for capturing dusty iron ores contained in an exhaust gas discharged from the drying/preheating furnace and recycling the captured dusty iron ores to the drying/preheating furnace while outwardly discharging cleaned exhaust gas, free of the dusty iron ores, the first cyclone being connected to the first exhaust gas outlet via a first exhaust gas line, being connected to the first dusty ore inlet via a first dusty ore discharge line, and being connected at a top portion thereof to a first cleaned exhaust gas line opened to the atmosphere;

a second cyclone for capturing dusty iron ores contained in an exhaust gas discharged from the reduction furnace and recycling the captured dusty iron ores to the reduction furnace while supplying cleaned exhaust gas, free of the dusty iron ores, to the drying/preheating furnace, the second cyclone being connected to the second exhaust gas outlet via a second exhaust gas discharge line, being connected to the second dusty ore inlet via a second dusty ore discharge line, and being connected to the first gas inlet via a second cleaned exhaust gas line;

a first duct line for connecting the first ore outlet and the second ore inlet so that the iron ore particles are fed therethrough;

a second duct line for connecting the second ore outlet to a melter gasifier so that the iron ore particles are fed to the melter gasifier therethrough; and an exhaust gas line for connecting the second gas inlet to the melter gasifier.

2. The fluidized-bed reduction apparatus in accordance with claim 1, wherein the first and second conical sections have a tapered angle ranging from 3° to 25°.

3. The fluidized-bed reduction apparatus in accordance with claim 1 or 2, wherein the first and second duct lines are provided at their bended portions with gas supply ports for supplying a small amount of gas to each corresponding duct line.

4. The fluidized-bed reduction apparatus in accordance with claim 1 or 2, wherein each of the first and second conical sections has a height 5.0 to 9.0 times as long as the inner diameter at the lower end thereof, and each of the first and second enlarged cylindrical sections has a height 2.0 to 4.0 times as long as the inner diameter of each corresponding conical section at the upper end thereof.

5. The fluidized-bed reduction apparatus in accordance with claim 3, wherein each of the first and second conical sections has a height 5.0 to 9.0 times as long as the inner diameter at the lower end thereof, and each of the first and second enlarged cylindrical sections has a height 2.0 to 4.0 times as long as the inner diameter of each corresponding conical section at the upper end thereof.

6. A fluidized-bed reduction apparatus for reducing iron ore particles, comprising:

a drying/preheating furnace for drying and preheating fine iron ores supplied from a hopper, the drying/preheating furnace including a first enlarged upper cylindrical section, a first intermediate conical section and a first reduced lower cylindrical section, the first intermediate conical section having a tapered shape being smoothly expanded upwards, the drying/preheating furnace further including a first gas inlet provided at a bottom portion of the first reduced cylindrical section, a first distributor installed at an upper portion of the first reduced cylindrical section, a first ore inlet provided at one side wall portion of the first conical section, a first ore outlet provided at the other side wall portion of the first conical section, a first dusty ore inlet provided at the other side wall portion of the first conical section, and a first exhaust gas outlet provided at an upper portion of the first enlarged cylindrical section;

a first reduction furnace for pre-reducing the fine iron ores dried and preheated in the drying/preheating furnace, the reduction furnace including a second enlarged upper cylindrical section, a second intermediate conical section and a second reduced lower cylindrical section, the second intermediate conical section having a tapered shape being smoothly expanded upward, the first reduction furnace further including a second gas inlet provided at a bottom portion of the second reduced cylindrical section, a second distributor installed at an upper portion of the second reduced cylindrical section, a second ore inlet provided at one side wall portion of the second conical section, a second ore outlet provided at the one side wall portion of the second conical section, a second dusty ore inlet provided at the other side wall portion of the second conical section, and a second exhaust gas outlet provided at an upper portion of the second enlarged cylindrical section;

a second reduction furnace for finally reducing the fine iron ores pre-reduced in the first reduction furnace, the reduction furnace including a third enlarged upper cylindrical section, a third intermediate conical section and a third reduced lower cylindrical section, the third intermediate conical section having a tapered shape being smoothly expanded upwards, the second reduction furnace further including a third gas inlet provided at a bottom portion of the third reduced cylindrical section, a third distributor installed at an upper portion of the third reduced cylindrical section, a third ore inlet provided at one side wall portion of the third conical section, a third ore outlet provided at the other side wall portion of the third conical section, a third dusty ore inlet provided at the other side wall portion of the third conical section, a third dusty ore outlet provided at the other side wall portion of the third conical section, and a third exhaust gas discharge port provided at an upper portion of the third enlarged cylindrical section;

a first cyclone for capturing dusty iron ores contained in an exhaust gas discharged from the drying/preheating furnace and recycling the captured dusty iron ore particles to the drying/preheating furnace while outwardly discharging cleaned exhaust gas, free of the dusty iron ore particles, the first cyclone being connected to the first exhaust gas outlet via a first exhaust gas discharge line, being connected to the first dusty ore inlet via a first dusty ore discharge line, and being connected at a top portion thereof to a first cleaned exhaust gas line opened to the atmosphere;

a second cyclone for capturing dusty iron ores contained in an exhaust gas discharged from the first reduction furnace and recycling the captured dusty iron ores to the first reduction furnace while supplying cleaned exhaust gas, free of the dusty iron ores, to the drying/preheating furnace, the second cyclone being connected to the second exhaust gas outlet via a second cleaned exhaust gas line, being connected to the second dusty ore inlet via a second dusty ore discharge line, and connected to the first gas inlet via a second cleaned exhaust gas line;

a third cyclone for capturing dusty iron ores contained in an exhaust gas discharged from the second reduction furnace and recycling the captured dusty iron ores to the second reduction furnace while supplying clean exhaust gas, free of the dusty iron ores, to the first reduction furnace, the third cyclone being connected to the third exhaust gas outlet via a third exhaust gas line, being connected to the third dusty ore inlet via a third dusty ore discharge line, and being connected to the second gas inlet via a third cleaned exhaust gas line;

a first duct line for connecting the first ore outlet and the second ore inlet so that the iron ore particles are fed therethrough;

a second duct line for connecting the second ore outlet and the third ore inlet so that the iron ore particles are fed therethrough;

a third duct line for connecting the third ore outlet to a melter gasifier; and an exhaust gas line for connecting the third gas inlet to the melter gasifier.

7. The fluidized-bed reduction apparatus in accordance with claim 1, further comprising at least one reduction furnace including an enlarged upper cylindrical section, an intermediate conical section and a reduced lower cylindrical section, the intermediate conical section having a tapered shape being smoothly expanded upwards.

8. The fluidized-bed reduction apparatus in accordance with claim 6, wherein each of the conical sections has a tapered angle ranging from 3° to 25°.

9. The fluidized-bed reduction apparatus in accordance with claim 6, wherein the first and second duct lines are provided at their bended portions with gas supply ports for supplying a small amount of gas to each corresponding duct line.

10. The fluidized-bed reduction apparatus in accordance with claim 6, wherein each of the conical sections has a height 5.0 to 9.0 times as long as the inner diameter at the lower end thereof, and each of the enlarged cylindrical sections has a height 2.0 to 4.0 times as long as the inner diameter of each corresponding conical section at the upper end thereof.

11. The fluidized-bed reduction apparatus in accordance with claim 9, wherein each of the conical sections has a height 5.0 to 9.0 times as long as the inner diameter at the lower end thereof, and each of the enlarged cylindrical sections has a height 2.0 to 4.0 times as long as the inner diameter of each corresponding conical section at the upper end thereof.

12. A method for reducing fine iron ores, comprising the steps of:

drying and preheating the fine iron ores in a bubbling fluidization state in a fluidized-bed drying/preheating furnace having a tapered shape being smoothly expanded upwards; and finally reducing the dried/preheated iron ores in a bubbling fluidization state in a fluidized-bed reduction furnace having a tapered shape being smoothly expanded upwards.

13. The method in accordance with claim 12, wherein the gas velocity at free board zone of either the drying/preheating furnace or reduction furnace is kept within 1.0 to 3.0 times the minimum gas velocity required for fluidizing iron ore particles of the mean grain size staying in the relevant furnace.

14. The method in accordance with claim 12 or 13, wherein the pressure of gas supplied to the reduction furnace ranges from 2 to 4 atm., and the pressure drop occurring in either the drying/preheating furnace or the reduction furnace ranges from 0.3 to 0.6 atm.

15. The method in accordance with claim 12 or 13, wherein the temperature of gas supplied to the reduction furnace ranges from 800° to 900° C., and the temperature drop occurring in either the drying/preheating furnace or the reduction furnace ranges from 30° to 80° C.

16. The method in accordance with claim 14, wherein the temperature of gas supplied to the reduction furnace ranges from 800° to 900° C., and the temperature drop occurring in either the drying/preheating furnace or the reduction furnace ranges from 30° to 80° C.

17. The method in accordance with claim 12 or 13, wherein the residence time of iron ore particles in either the drying/preheating furnace or the reduction furnace ranges from 30 to 50 minutes.

18. The method in accordance with claim 14, wherein the residence time of iron ore particles in either the drying/preheating furnace or the reduction furnace ranges from 30 to 50 minutes.

19. The method in accordance with claim 15, wherein the residence time of iron ore particles in either the drying/preheating furnace or the reduction furnace ranges from 30 to 50 minutes.

20. The method in accordance with claim 16, wherein the residence time of iron ore particles in either the drying/preheating furnace or the reduction furnace ranges from 30 to 50 minutes.

21. A method for reducing iron ore particles, comprising the steps of:

drying and preheating the iron ore particles in a bubbling fluidization state in a fluidized-bed drying/preheating furnace having a tapered shape being smoothly expanded upwards;

pre-reducing the dried/preheated fine iron ores in a bubbling fluidization state in a first fluidized-bed reduction furnace having a tapered shape being smoothly expanded upwards; and finally reducing the pre-reduced fine iron ores in a bubbling fluidization state in a second fluidized-bed reduction furnace having a tapered shape being smoothly expanded upwards.

22. The method in accordance with claim 21, wherein the gas velocity at free board zone in each of the drying/preheating furnace, first reduction furnace and second reduction furnace is kept within 1.0 to 3.0 times the minimum gas velocity required for fluidizing iron ore particles of the mean grain size staying in the associated furnace.

23. The method in accordance with claim 21 or 22, wherein the pressure of gas supplied to the second reduction furnace ranges from 2 to 4 atm., and the pressure drop occurring in the drying/preheating furnace, the first reduction furnace, or the second reduction furnace ranges from 0.3 to 0.6 atm.

24. The method in accordance with claim 21 or 22, wherein the temperature of gas supplied to the second reduction furnace ranges from 800° to 900° C., and the temperature drop occurring in each of the drying/preheating furnace, the first reduction furnace and second reduction furnace ranges from 30° to 80° C.

25. The method in accordance with claim 23, wherein the temperature of gas supplied to the second reduction furnace ranges from 800° to 900° C., and the temperature drop occurring in each of the drying/preheating furnace, first reduction furnace and second reduction furnace ranges from 30° to 80° C.

26. The method in accordance with claim 21 or 22, wherein the residence time of iron ore particles in each of the drying/preheating furnace, first reduction furnace and second reduction furnace ranges from 20 to 40 minutes.

27. The method in accordance with claim 23, wherein the residence time of iron ore particles in each of the drying/preheating furnace, first reduction furnace and second reduction furnace ranges from 20 to 40 minutes.

28. The method in accordance with claim 24, wherein the residence time of iron ore particles in each of the drying/preheating furnace, first reduction furnace and second reduction furnace ranges from 20 to 40 minutes.

29. The method in accordance with claim 25, wherein the residence time of iron ore particles in each of the drying/preheating furnace, first reduction furnace and second reduction furnace ranges from 20 to 40 minutes.

30. The fluidized-bed reduction apparatus in accordance with claim 7, wherein each of the conical sections has a tapered angle ranging from 3° to 25°.

31. The fluidized-bed reduction apparatus in accordance with claim 7, wherein the first and second duct lines are provided at their bended portions with gas supply ports for supplying a small amount of gas to each corresponding duct line.

32. The fluidized-bed reduction apparatus in accordance with claim 8, wherein the first and second duct lines are provided at their bended portions with gas supply ports for supplying a small amount of gas to each corresponding duct line.

33. The fluidized-bed reduction apparatus in accordance with claim 7, wherein each of the conical sections has a height 5.0 to 9.0 times as long as the inner diameter at the lower end thereof, and each of the enlarged cylindrical sections has a height 2.0 to 4.0 times as long as the inner diameter of each corresponding conical section at the upper end thereof.

34. The fluidized-bed reduction apparatus in accordance with claim 8, wherein each of the conical sections has a height 5.0 to 9.0 times as long as the inner diameter at the lower end thereof, and each of the enlarged cylindrical sections has a height 2.0 to 4.0 times as long as the inner diameter of each corresponding concial section at the upper end thereof.

35. The fluidized-bed reduction apparatus in accordance with claim 31, wherein each of the conical sections has a height 5.0 to 9.0 times as long as the inner diameter at the lower end thereof, and each of the enlarged cylindrical sections has a height 2.0 to 4.0 times as long as the inner diameter of each corresponding conical section at the upper end thereof.

36. The fluidized-bed reduction apparatus in accordance with claim 32, wherein each of the conical sections has a height 5.0 to 9.0 times as long as the inner diameter at the lower end thereof, and each of the enlarged cylindrical sections has a height 2.0 to 4.0 times as long as the inner diameter of each corresponding conical section at the upper end thereof.

* * * * *